US012803081B2

(12) United States Patent
Zhong et al.

(10) Patent No.: US 12,803,081 B2
(45) Date of Patent: Nov. 17, 2026

(54) HEAT-DISSIPATING MEMBER, ENERGY-STORAGE APPARATUS, AND ELECTRICITY-CONSUMPTION DEVICE

(71) Applicant: Hithium Tech HK Limited, Kowloon (HK)

(72) Inventors: Deliang Zhong, Xiamen (CN); Changfeng Wu, Xiamen (CN); Weipeng Huang, Xiamen (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 409 days.

(21) Appl. No.: 18/664,839

(22) Filed: May 15, 2024

(65) Prior Publication Data

US 2025/0007041 A1 Jan. 2, 2025

(30) Foreign Application Priority Data

Jun. 29, 2023 (CN) ......................... 202310785709.6

(51) Int. Cl.
*H05K 7/20* (2006.01)
*F28F 1/02* (2006.01)
(Continued)

(52) U.S. Cl.
CPC ... *H01M 10/6568* (2015.04); *H01M 10/6555* (2015.04); *F28F 1/022* (2013.01)

(58) Field of Classification Search
CPC ......... H01M 10/6568; H01M 10/6555; H01M 10/655; H01M 10/6554; H01M 10/6556;
(Continued)

(56) References Cited

U.S. PATENT DOCUMENTS

2017/0194678 A1* 7/2017 Yang ................. H01M 10/6557
2018/0063992 A1* 3/2018 Wan ................... H05K 7/20254

FOREIGN PATENT DOCUMENTS

CN 108183285 A 6/2018
CN 209001074 U 6/2019
(Continued)

OTHER PUBLICATIONS

EPO, Extended European Search Report for corresponding European Patent Application No. 24175190.8, Nov. 25, 2024, 9 pages.
(Continued)

*Primary Examiner* — Christian Roldan
(74) *Attorney, Agent, or Firm* — Hodgson Russ LLP

(57) ABSTRACT

A heat-dissipating member, an energy-storage apparatus, and an electricity-consumption device are disclosed. The heat-dissipating member includes a first heat-dissipating portion and at least one second heat-dissipating portion. The first heat-dissipating portion is connected to each of the at least one second heat-dissipating portion to form a transition section. A liquid inlet channel and a liquid outlet channel of the heat-dissipating member both are positioned inside the first heat-dissipating portion and the at least one second heat-dissipating portion and pass through the transition section. Two harmonica-shaped tubes are disposed inside the transition section. Each of the two harmonica-shaped tubes defines a flow channel cavity. One flow channel cavity is in communication with the liquid inlet channel, and the other one flow channel cavity is in communication with the liquid outlet channel.

20 Claims, 5 Drawing Sheets

(51) Int. Cl.
*H01M 10/6555* (2014.01)
*H01M 10/6568* (2014.01)

(58) Field of Classification Search
CPC .. H01M 10/613; H01M 2220/10; F28F 1/022; H05K 7/20; H05K 7/20254; Y02D 10/00; Y02E 60/10
See application file for complete search history.

(56) References Cited

FOREIGN PATENT DOCUMENTS

| | | | | |
|---|---|---|---|---|
| CN | 217848100 | U | | 11/2022 |
| CN | 115472968 | A | | 12/2022 |
| CN | 218215453 | U | | 1/2023 |
| CN | 115719842 | A | * | 2/2023 |
| CN | 218498188 | U | | 2/2023 |
| EP | 4343927 | A1 | | 3/2024 |

OTHER PUBLICATIONS

CNIPA, International Search Report for International Patent Application No. PCT/CN2024/080548, Jun. 7, 2024, 9 pages.
CNIPA, Written Opinion for International Patent Application No. PCT/CN2024/080548, Jun. 7, 2024, 11 pages.

* cited by examiner

HEAT-DISSIPATING MEMBER, ENERGY-STORAGE APPARATUS, AND ELECTRICITY-CONSUMPTION DEVICE

CROSS-REFERENCE TO RELATED APPLICATIONS

This application claims priority under 35 U.S.C. § 119(a) to and the benefit of Chinese Patent Application No. 202310785709.6, filed Jun. 29, 2023, the entire disclosure of which is incorporated herein by reference.

TECHNICAL FIELD

This disclosure relates to the field of energy-storage technology, and in particular, to a heat-dissipating member, an energy-storage apparatus, and an electricity-consumption device.

BACKGROUND

Generally, an energy-storage apparatus includes a cell module, a heat-dissipating plate, and a box body. The box body defines an accommodating cavity. The cell module and the heat-dissipating plate are positioned in the accommodating cavity of the box body. The cell module is formed by multiple stacked cells. A cooling channel is defined in the heat-dissipating plate. The heat-dissipating plate is attached to an outer surface of the cell module and is configured to dissipate heat for the cell module. In the related art, the heat-dissipating plate usually needs to be bent to dissipate heat for multiple surfaces of the cell module.

SUMMARY

In a first aspect, a heat-dissipating member is provided in the disclosure. The heat-dissipating member includes a first heat-dissipating portion and at least one second heat-dissipating portion. The first heat-dissipating portion is connected to the at least one second heat-dissipating portion. A transition section is formed between the first heat-dissipating portion and each of the at least one second heat-dissipating portion. The heat-dissipating member defines a liquid inlet channel and a liquid outlet channel. The liquid inlet channel and the liquid outlet channel both are positioned inside the first heat-dissipating portion and the at least one second heat-dissipating portion and pass through the transition section. Two harmonica-shaped tubes are disposed inside the transition section, and the two harmonica-shaped tubes are positioned in the liquid inlet channel and the liquid outlet channel respectively. Each of the two harmonica-shaped tubes defines a flow channel cavity. The flow channel cavity of one of the two harmonica-shaped tubes positioned in the liquid inlet channel is in communication with the liquid inlet channel, and the flow channel cavity of the other one of the two harmonica-shaped tubes positioned in the liquid outlet channel is in communication with the liquid outlet channel. The two harmonica-shaped tubes each have a first wall, a second wall, a third wall, and a fourth wall. The first wall and the second wall are positioned facing towards each other in a height direction of the heat-dissipating member. The third wall and the fourth wall are connected between the first wall and the second wall and are positioned facing towards each other in a thickness direction of the heat-dissipating member. The first heat-dissipating portion includes a first heat-dissipating plate and a second heat-dissipating plate. The first heat-dissipating plate and the second heat-dissipating plate are disposed facing towards each other. The at least one second heat-dissipating portion each includes a third heat-dissipating plate and a fourth heat-dissipating plate. The third heat-dissipating plate and the fourth heat-dissipating plate are disposed facing towards each other. The first heat-dissipating plate is connected to the third heat-dissipating plate, and the second heat-dissipating plate is connected to the fourth heat-dissipating plate.

In a second aspect, an energy-storage apparatus is provided in the disclosure. The energy-storage apparatus includes a box body, a cell module, and a heat-dissipating member. The box body defines a liquid inlet through-hole and a liquid outlet through-hole. The heat-dissipating member and the cell module are accommodated in the box body. The heat-dissipating member is attached to a surface of the cell module. The heat-dissipating member includes a first heat-dissipating portion and at least one second heat-dissipating portion. The first heat-dissipating portion is connected to the at least one second heat-dissipating portion. A transition section is formed between the first heat-dissipating portion and each of the at least one second heat-dissipating portion. The heat-dissipating member defines a liquid inlet channel and a liquid outlet channel. The liquid inlet channel and the liquid outlet channel both are positioned inside the first heat-dissipating portion and the at least one second heat-dissipating portion and pass through the transition section. Two harmonica-shaped tubes are disposed inside the transition section, and the two harmonica-shaped tubes are positioned in the liquid inlet channel and the liquid outlet channel respectively. Each of the two harmonica-shaped tubes defines a flow channel cavity. The flow channel cavity of one of the two harmonica-shaped tubes positioned in the liquid inlet channel is in communication with the liquid inlet channel, and the flow channel cavity of the other one of the two harmonica-shaped tubes positioned in the liquid outlet channel is in communication with the liquid outlet channel. The two harmonica-shaped tubes each have a first wall, a second wall, a third wall, and a fourth wall. The first wall and the second wall are positioned facing towards each other in a height direction of the heat-dissipating member. The third wall and the fourth wall are connected between the first wall and the second wall and are positioned facing towards each other in a thickness direction of the heat-dissipating member. The first heat-dissipating portion includes a first heat-dissipating plate and a second heat-dissipating plate. The first heat-dissipating plate and the second heat-dissipating plate are disposed facing towards each other. The at least one second heat-dissipating portion each includes a third heat-dissipating plate and a fourth heat-dissipating plate. The third heat-dissipating plate and the fourth heat-dissipating plate are disposed facing towards each other. The first heat-dissipating plate is connected to the third heat-dissipating plate, and the second heat-dissipating plate is connected to the fourth heat-dissipating plate. The liquid inlet channel is in communication with the liquid inlet through-hole, and the liquid outlet channel is in communication with the liquid outlet through-hole.

In a third aspect, an electricity-consumption device is provided in the disclosure. The electricity-consumption device includes an energy-storage apparatus. The energy-storage apparatus includes a box body, a cell module, and a heat-dissipating member. The box body defines a liquid inlet through-hole and a liquid outlet through-hole. The heat-dissipating member and the cell module are accommodated in the box body. The heat-dissipating member is attached to a surface of the cell module. The heat-dissipating member includes a first heat-dissipating portion and at least one second heat-dissipating portion. The first heat-dissipating portion is connected to the at least one second heat-dissipating portion. A transition section is formed between the first heat-dissipating portion and each of the at least one second heat-dissipating portion. The heat-dissipating member defines a liquid inlet channel and a liquid outlet channel. The liquid inlet channel and the liquid outlet channel both are positioned inside the first heat-dissipating portion and the at least one second heat-dissipating portion and pass through the transition section. Two harmonica-shaped tubes are disposed inside the transition section, and the two harmonica-shaped tubes are positioned in the liquid inlet channel and the liquid outlet channel respectively. Each of the two harmonica-shaped tubes defines a flow channel cavity. The flow channel cavity of one of the two harmonica-shaped tubes positioned in the liquid inlet channel is in communication with the liquid inlet channel, and the flow channel cavity of the other one of the two harmonica-shaped tubes positioned in the liquid outlet channel is in communication with the liquid outlet channel. The two harmonica-shaped tubes each have a first wall, a second wall, a third wall, and a fourth wall. The first wall and the second wall are positioned facing towards each other in a height direction of the heat-dissipating member. The third wall and the fourth wall are connected between the first wall and the second wall and are positioned facing towards each other in a thickness direction of the heat-dissipating member. The first heat-dissipating portion includes a first heat-dissipating plate and a second heat-dissipating plate. The first heat-dissipating plate and the second heat-dissipating plate are disposed facing towards each other. The at least one second heat-dissipating portion each includes a third heat-dissipating plate and a fourth heat-dissipating plate. The third heat-dissipating plate and the fourth heat-dissipating plate are disposed facing towards each other. The first heat-dissipating plate is connected to the third heat-dissipating plate, and the second heat-dissipating plate is connected to the fourth heat-dissipating plate. The liquid inlet channel is in communication with the liquid inlet through-hole, and the liquid outlet channel is in communication with the liquid outlet through-hole.

BRIEF DESCRIPTION OF THE DRAWINGS

In order to illustrate technical solutions in the disclosure more clearly, the following will give a brief introduction to the accompanying drawings required for describing implementations. Apparently, the accompanying drawings described below are merely some implementations of the disclosure. Based on these drawings, those of ordinary skill in the art can also obtain other drawings without creative effort.

Figure 1:
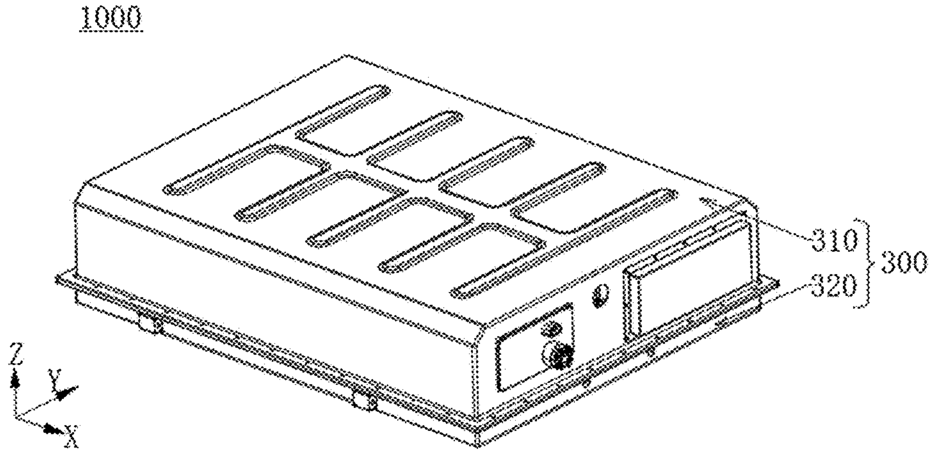
FIG. 1 is a schematic structural view of an energy-storage apparatus provided in an embodiment of the disclosure.

Description of reference numbers: 2000—electricity—consumption device; 1000—energy—storage apparatus, 300—box body, 200—cell module, 100—heat—dissipating member, 310—cover case, 320—bottom case, 321—liquid inlet through—hole, 322—liquid outlet through—hole, 210—cell, 220—connection sheet, 230—fixing portion, A—cell group, 10—heat—dissipating portion, 30—liquid inlet tube, 40—liquid outlet tube, 11—first heat—dissipating portion, 12—second heat—dissipating portion, 111—first heat—dissipating plate, 112—second heat—dissipating plate, 113—liquid inlet, 114—liquid outlet, 121—third heat—dissipating plate, 122—fourth heat—dissipating plate, 13—transition section, 131—first transition section, 132—second transition section, 20—harmonica—shaped tube, 21—first wall, 22—second wall, 23—third wall, 24—fourth wall, 25—reinforcing rib, 251—first reinforcing rib, 252—second reinforcing rib, 253—third reinforcing rib, 26—flow channel cavity, 111A—first liquid inlet channel, 111B—first liquid outlet channel, 121A—second liquid inlet channel, and 121B—second liquid outlet channel.

DETAILED DESCRIPTION

The following will describe technical solutions of embodiments of the disclosure clearly and completely with reference to the accompanying drawings in embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

Since energy required by people has strong temporal and spatial characteristics, in order to use energy in a reasonable manner and improve energy utilization, a medium or a device is required to store energy in the same energy form or in another energy form converted and then to release energy in a specific energy form based on requirements of future applications. As is well-known, in order to achieve the big goal for carbon neutrality, the main way of generating green electrical energy is currently to develop green energy such as photovoltaics and wind power to replace fossil energy. At present, generation of green electrical energy is generally dependent on photovoltaics, wind power, water potential, and the like. However, in general, wind energy, solar energy, and the like are strongly intermittent and volatile, resulting in an unstable power grid, insufficient power supply at a power consumption peak, and overmuch power supply at a power consumption valley. In addition, an unstable voltage may further damage electric power. Therefore, "abandoned wind and abandoned light" may occur due to insufficient power demand or insufficient power-grid admitting ability, and energy storage is required to solve these problems. That is, electrical energy is stored by converting it into other forms of energy by physical or chemical means, and energy is released by converting it into electrical energy when needed. In brief, energy storage is similar to a large "power bank", which stores electrical energy when photovoltaics and wind energy are sufficient and releases stored electric power when needed.

An energy-storage apparatus is provided in the disclosure. A group of chemical batteries is disposed in the energy-storage apparatus. Chemical elements in the chemical batteries can be mainly used as an energy-storage medium, and a charging/discharging process goes with chemical reaction or change of the energy-storage medium. In brief, electrical energy generated by wind energy and solar energy is stored in the chemical batteries. When the usage of external electrical energy reaches a peak, the power stored is released for use or is transferred to a place where the power is scarce for reuse.

The energy-storage apparatus provided in the disclosure can be applied to a wide range of scenarios, including (wind and light) power-generation-side energy storage, grid-side energy storage, base-station-side energy storage, user-side energy storage, and other aspects. The energy-storage apparatus is usually used in forms of an energy-storage container, a small and medium-sized energy-storage cabinet, a small-sized household energy-storage container, and the like. Devices such as the energy-storage container, the small and medium-sized energy-storage cabinet, and the small-sized household energy-storage container include the energy-storage apparatus.

It may be noted that, the above devices including the energy-storage apparatus, such as the energy-storage container, the small and medium-sized energy-storage cabinet, and the small-sized household energy-storage container, can be understood as an electricity-consumption device 2000.

The energy-storage apparatus 1000 may be implemented as multiple energy-storage apparatuses. The multiple energy-storage apparatuses 1000 are connected to each other in series or in parallel. In the embodiment, "multiple" refers to two or more.

It may be understood that, the energy-storage apparatus 1000 may include, but is not limited to, a battery cell, a cell module, a battery pack, a battery system, or the like. A practical application form of the energy-storage apparatus 1000 provided in embodiments of the disclosure may be, but is not limited to, the listed product, and may further be other application forms. The application form of the energy-storage apparatus 1000 is not strictly limited in embodiments of the disclosure. In embodiments of the disclosure, for example, the energy-storage apparatus 1000 is merely a multi-cell battery.

However, local deformation and even fracture due to stress concentration easily occur at a bend, so that a cooling medium in the heat-dissipating plate is difficult to pass through the bend of the heat-dissipating plate, and the heat dissipation effect of the heat-dissipating plate is affected. A heat-dissipating member, an energy-storage apparatus, and an electricity-consumption device are provided in the disclosure, which can improve the structural strength of a bend of the heat-dissipating member and avoid local deformation or fracture of the heat-dissipating member after being bent.

Figure 2:
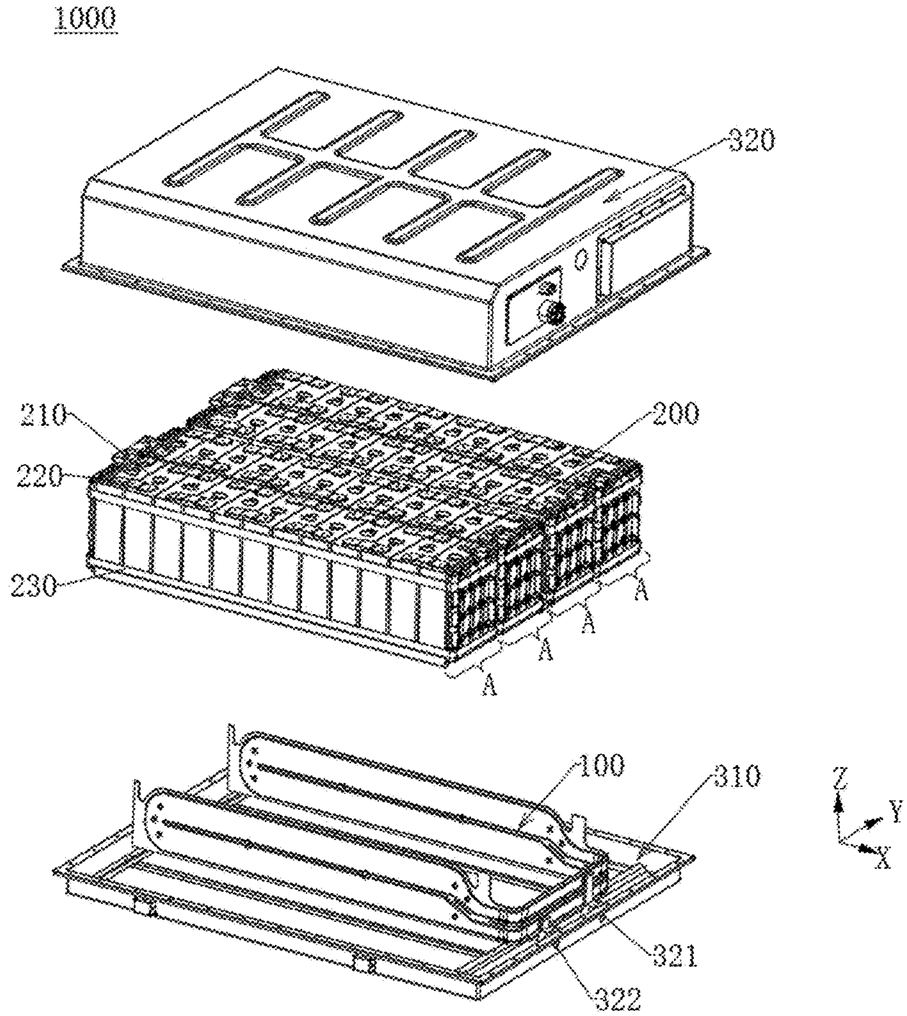
FIG. 2 is an exploded schematic structural view of the energy-storage apparatus illustrated in FIG. 1.

As illustrated in FIG. 1 and FIG. 2, in this embodiment, the energy-storage apparatus 1000 includes a box body 300, a cell module 200, and a heat-dissipating member 100. The box body 300 includes a cover case 310 and a bottom case 320. The bottom case 320 defines a liquid inlet through-hole 321 and a liquid outlet through-hole 322. The cell module 200 and the heat-dissipating member 100 each are fixed to the bottom case 320. The cover case 310 covers the cell module 200 and the heat-dissipating member 100 and is fixedly connected to the bottom case 320, so as to enclose the cell module 200 and the heat-dissipating member 100 in the box body 300.

For ease of illustration, a length direction of the heat-dissipating member 100 illustrated in FIG. 2 is defined as an X-axis direction, a width direction of the heat-dissipating member 100 is defined as a Y-axis direction, and a height direction of the heat-dissipating member 100 is defined as a Z-axis direction, where every two of the X-axis direction, the Y-axis direction, and the Z-axis direction are perpendicular to each other. Directional terms such as "on", "under", and the like referred to in description of embodiments of the disclosure are described according to locations illustrated in FIG. 2. A direction towards a positive direction of Z-axis is "on", and a direction towards a negative direction of Z-axis is "under", which do not constitute limitation to the heat-dissipating member 100 in a practical application scenario. "Same", "equal", or "parallel" used below means that some allowable error may exist.

In this embodiment, the cell module 200 includes multiple cells 210, multiple connection sheets 220, and a fixing portion 230. The multiple cells 210 are divided into four cell groups A. The cells 210 of each cell group A are numerically equal and are sequentially arranged in a length direction of the cell module 200 (X-axis direction). The four cell groups A are arranged side by side in a width direction of the cell module 200 (Y-axis direction). The multiple connection sheets 220 are configured to connect the multiple cells 210 to one another. The fixing portion 230 is disposed on an outer periphery of the four cell groups A and is configured to tightly connect the four cell groups A, so that the four cell groups A are connected to form an integrated structure. Specifically, the fixing portion 230 is a polyethylene terephthalate (PET) strap. In other embodiments, the multiple cells 210 may also be divided into one, two, or more cell groups A. The fixing portion 230 may also be a fixing plate. This is specifically determined based on actual usage requirements, and the disclosure is not limited in this regard.

Figure 3:
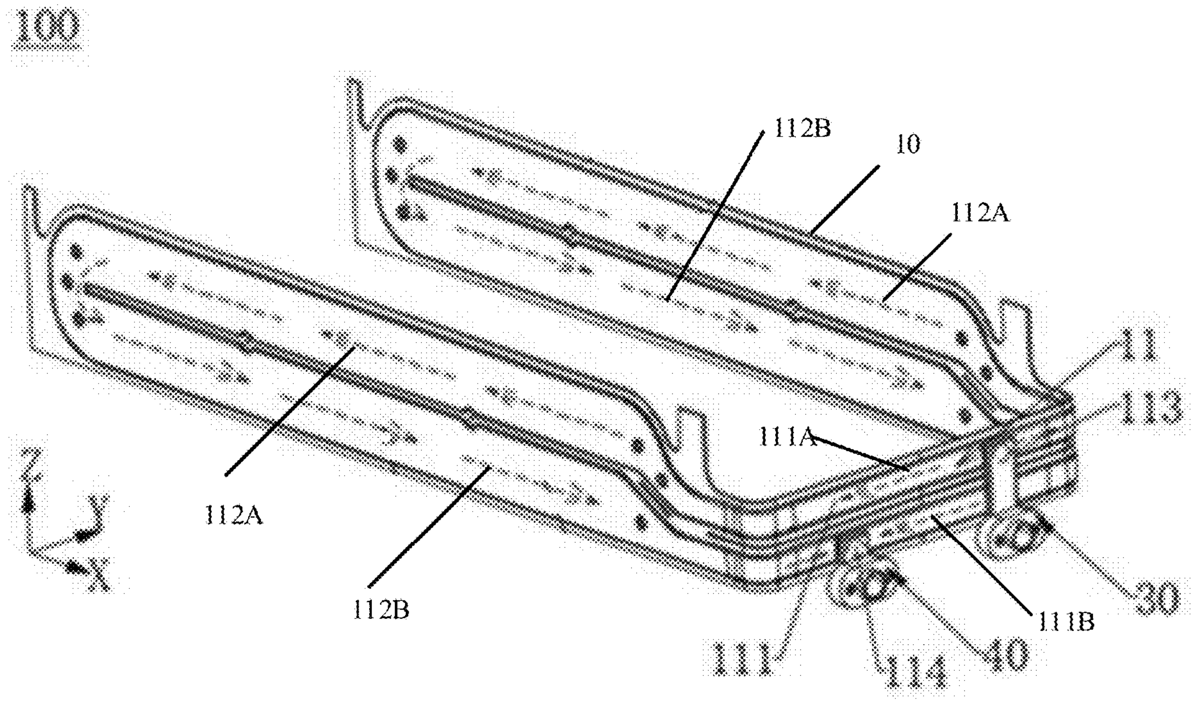
FIG. 3 is a schematic structural view of a heat-dissipating member of the energy-storage apparatus illustrated in FIG. 2.
Figure 4:
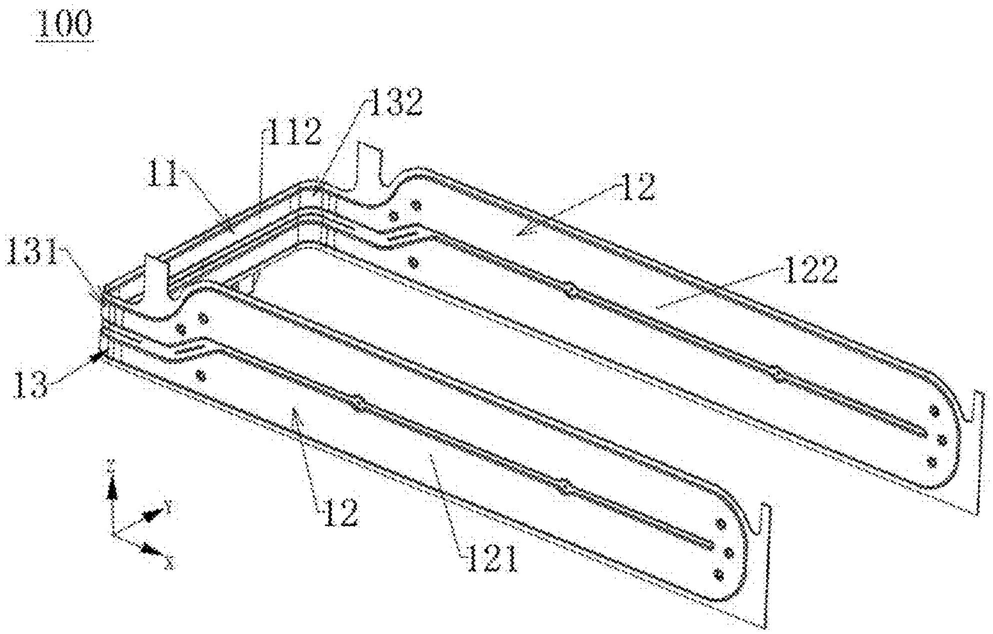
FIG. 4 is a schematic structural view of the heat-dissipating member of the energy-storage apparatus illustrated in FIG. 3, viewed from a second direction.
Figure 5:
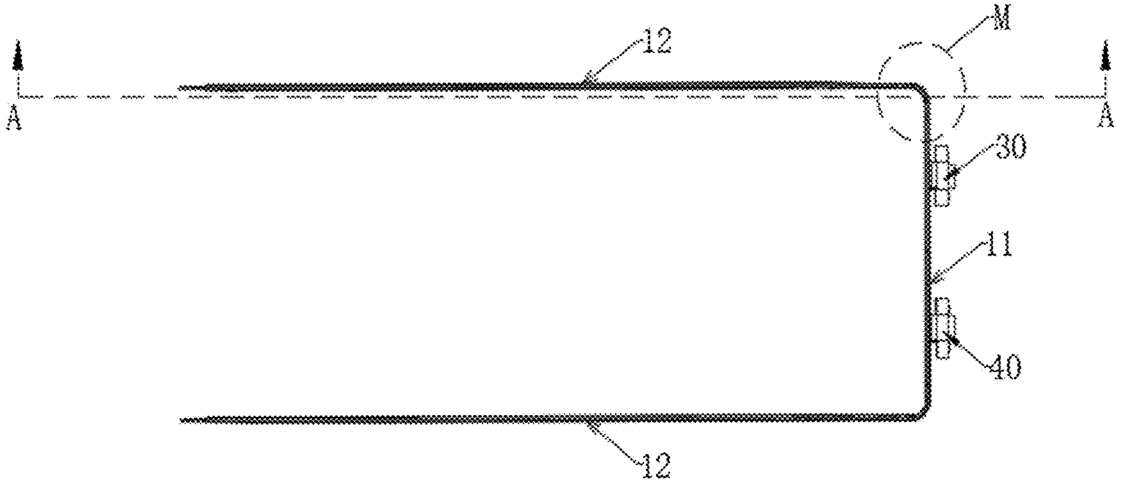
FIG. 5 is a schematic structural view of the heat-dissipating member of the energy-storage apparatus illustrated in FIG. 3, viewed from a third direction.
Figure 6:
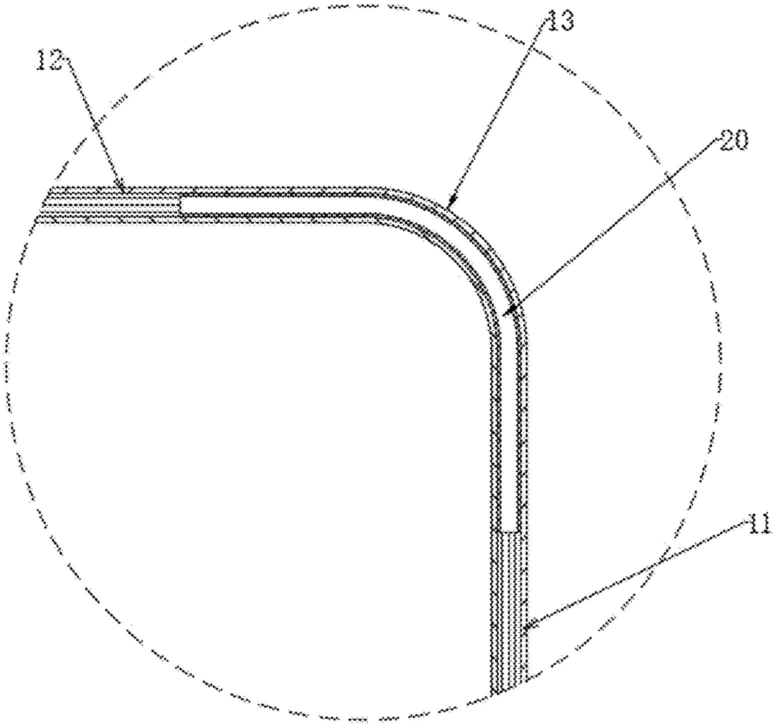
FIG. 6 is an enlarged schematic structural view of the heat-dissipating member illustrated in FIG. 5, at part M.
Figure 7:
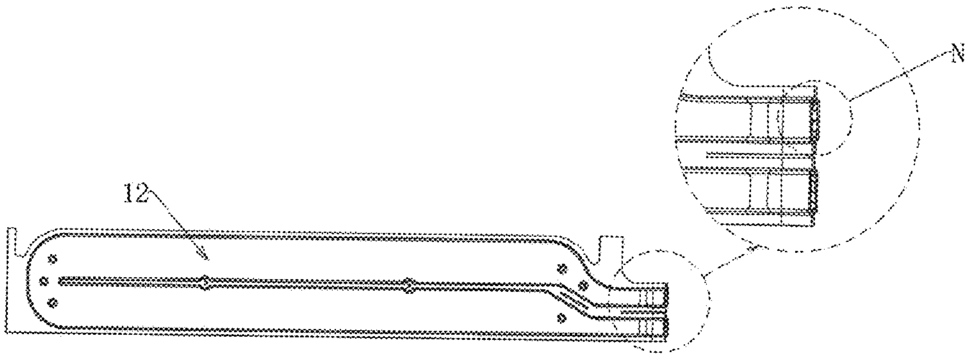
FIG. 7 is a cross-sectional schematic structural view of the heat-dissipating member illustrated in FIG. 5, taken along direction A-A.
Figure 8:
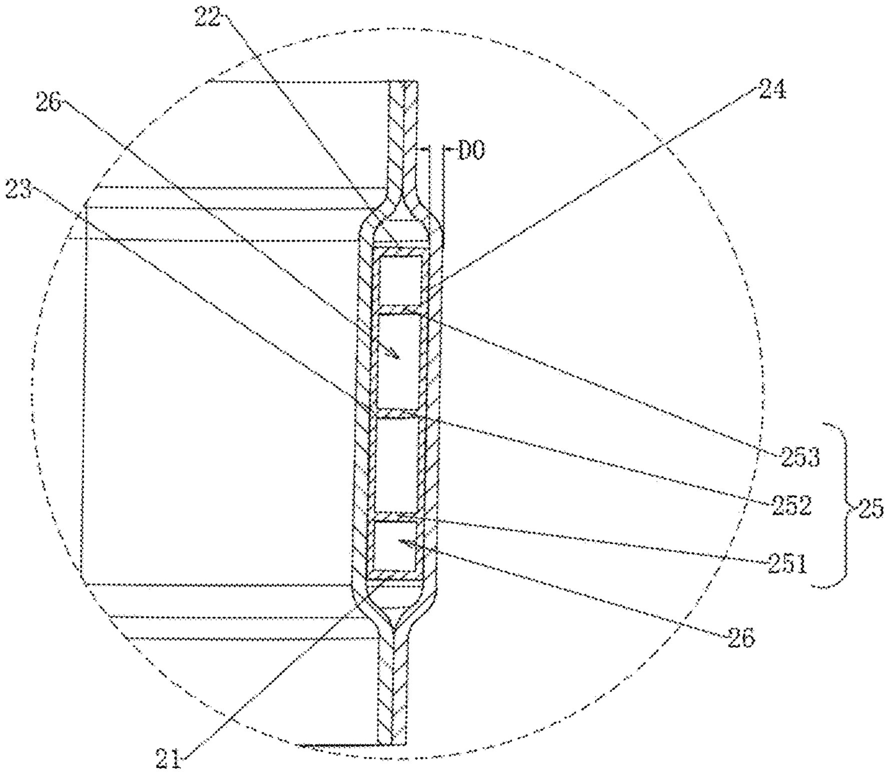
FIG. 8 is an enlarged schematic structural view of the heat-dissipating member illustrated in FIG. 7, at part N.
Figure 9:
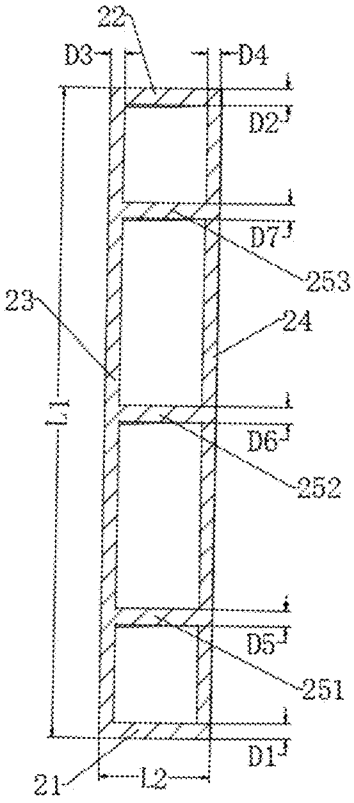
FIG. 9 is a schematic view illustrating dimensioning of a harmonica-shaped tube illustrated in FIG. 8.
Figure 10:
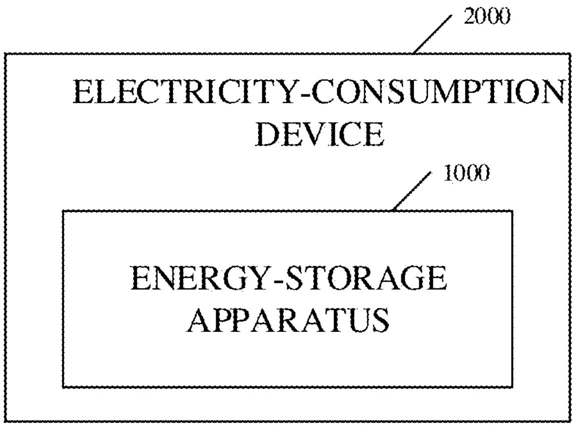
FIG. 10 is a schematic block diagram of an electricity-consumption device.

As illustrated in FIG. 3 to FIG. 5, a heat-dissipating member 100 is provided in an embodiment of the disclosure. In this embodiment, the heat-dissipating member 100 includes a heat-dissipating portion 10, a harmonica-shaped tube 20, a liquid inlet tube 30, and a liquid outlet tube 40. The harmonica-shaped tube is positioned in the heat-dissipating portion 10. The liquid inlet tube 30 and the liquid outlet tube 40 each are connected to the heat-dissipating portion 10.

The heat-dissipating portion 10 includes a first heat-dissipating portion 11 and at least one second heat-dissipating portion 12. The first heat-dissipating portion 11 is connected to the at least one second heat-dissipating portion 12. Specifically, in this embodiment, the at least one second heat-dissipating portion 12 is implemented as two second heat-dissipating portions. The two second heat-dissipating portions 12 are connected to two opposite ends of the first heat-dissipating portion 11 in the length direction of the first heat-dissipating portion 11 respectively, and the two second heat-dissipating portions 12 each are angled relative to the first heat-dissipating portion 11.

It may be noted that, in other embodiments, the at least one second heat-dissipating portion 12 may also be implemented as one or more second heat-dissipating portions. The number (quantity) of second heat-dissipating portions 12 is not specifically limited in the disclosure.

In this embodiment, the first heat-dissipating portion 11 includes a first heat-dissipating plate 111 and a second heat-dissipating plate 112. The first heat-dissipating plate

111 defines a liquid inlet 113 and a liquid outlet 114. The liquid inlet 113 penetrates through two surfaces of the first heat-dissipating plate 111 that are positioned facing away from each other in the thickness direction of the first heat-dissipating plate 111. The liquid outlet 114 penetrates through two surfaces of the first heat-dissipating plate 111 that are positioned facing away from each other in the thickness direction of the first heat-dissipating plate 111. In a height direction of the first heat-dissipating portion 11 (Z-axis direction), the liquid inlet 113 and the liquid outlet 114 are spaced apart from each other. In a thickness direction of the first heat-dissipating portion 11, the first heat-dissipating plate 111 and the second heat-dissipating plate 112 are disposed facing towards each other. A first liquid inlet channel 111A and a first liquid outlet channel 111B each are defined between the first heat-dissipating plate 111 and the second heat-dissipating plate 112. The first liquid inlet channel 111A and the first liquid outlet channel 111B each extend in the length direction of the first heat-dissipating portion 11, and the first liquid inlet channel 111A and the first liquid outlet channel 111B are spaced apart from each other in the height direction of the first heat-dissipating portion 11. The first liquid inlet channel 111A is in communication with the liquid inlet 113, and the first liquid outlet channel 111B is in communication with the liquid outlet 114. Thicknesses of the first heat-dissipating plate 111 and the second heat-dissipating plate 112 are both DO.

The at least one second heat-dissipating portion 12 each includes a third heat-dissipating plate 121 and a fourth heat-dissipating plate 122. In a thickness direction of the second heat-dissipating portion 12, the third heat-dissipating plate 121 and the fourth heat-dissipating plate 122 are disposed facing towards each other. A second liquid inlet channel 121A and a second liquid outlet channel 121B each are defined between the third heat-dissipating plate 121 and the fourth heat-dissipating plate 122. The second liquid inlet channel 121A and the second liquid outlet channel 121B each extend in a length direction of the second heat-dissipating portion 12, and the second liquid inlet channel 121A and the second liquid outlet channel 121B are spaced apart from each other in a height direction of the second heat-dissipating portion 12 (Z-axis direction). The second liquid inlet channel 121A is in communication with the second liquid outlet channel 121B. Thicknesses of the third heat-dissipating plate 121 and the fourth heat-dissipating plate 122 are both DO. The thicknesses of the third heat-dissipating plate 121 and the fourth heat-dissipating plate 122 are equal to the thicknesses of the first heat-dissipating plate 111 and the second heat-dissipating plate 112.

The first heat-dissipating portion 11 is connected to the at least one second heat-dissipating portion 12, and a transition section 13 is formed between the first heat-dissipating portion 11 and each of the at least one second heat-dissipating portion 12. Specifically, in this embodiment, the two second heat-dissipating portions 12 are connected to two opposite ends of the first heat-dissipating portion 11 in the length direction of the first heat-dissipating portion 11 (Y-axis direction), respectively. In a width direction of the heat-dissipating member 100 (Y-axis direction), the two second heat-dissipating portions 12 are disposed facing towards each other. The first heat-dissipating portion 11 is connected between the two second heat-dissipating portions 12. The two second heat-dissipating portions 12 each are perpendicular to the first heat-dissipating portion 11 (a certain process tolerance is allowed). Specifically, two opposite ends of the first heat-dissipating plate 111 in the length direction of the first heat-dissipating portion 11 are connected to two third heat-dissipating plates 121, respectively. The first heat-dissipating plate 111 is angled relative to the third heat-dissipating plate 121, and the angle is arc-shaped. Two opposite ends of the second heat-dissipating plate 112 in the length direction of the first heat-dissipating portion 11 are connected to two fourth heat-dissipating plates 122, respectively. The second heat dissipating plate 112 is angled relative to the fourth heat-dissipating plate 122, and the angle is arc-shaped. It may be understood that, the whole heat-dissipating portion 10 is in a "U" shape. Two transition sections 13 are respectively formed at a joint between the first heat-dissipating portion 11 and one of the two second heat-dissipating portions 12 and at a joint between the first heat-dissipating portion 11 and the other one of the two second heat-dissipating portions 12. The two transition sections 13 are specifically a first transition section 131 and a second transition section 132. Each of the first transition section 131 and the second transition section 132 is of an arc-shaped structure. The first transition section 131 and the second transition section 132 each are a part of the first heat-dissipating portion 11, and are respectively positioned at two opposite ends of the first heat-dissipating portion 11 in the length direction of the first heat-dissipating portion 11. One of the two second heat-dissipating portions 12 is connected to the first heat-dissipating portion 11 through the first transition section 131, and the other one of the two second heat-dissipating portions 12 is connected to the first heat-dissipating portion 11 through the second transition section 132. Two opposite ends of the first liquid inlet channel 111A in the length direction of the first heat-dissipating portion 11 are in communication with two second liquid inlet channels 121A respectively, so as to define a liquid inlet channel. Two opposite ends of the first liquid outlet channel 111B in the length direction of the first heat-dissipating portion 11 are in communication with two second liquid outlet channels 121B respectively, so as to define a liquid outlet channel. An end of each of the two second liquid inlet channels 121A facing away from the first liquid inlet channel 111A is in communication with an end of one of the two second liquid outlet channels 121B facing away from the first liquid outlet channel 111B. The liquid inlet channel and the liquid outlet channel both are positioned inside the first heat-dissipating portion 11 and the at least one second heat-dissipating portion 12. Specifically, in this embodiment, the liquid inlet channel and the liquid outlet channel both are positioned inside the first heat-dissipating portion 11 and each of the two second heat-dissipating portions 12. The liquid inlet channel and the liquid outlet channel pass through the transition section 13 between the first heat-dissipating portion 11 and each of the two second heat-dissipating portions 12.

It may be noted that, in this embodiment, the first heat-dissipating portion 11 and the two second heat-dissipating portions 12 are an integrally-formed metal structural member. Each of the two second heat-dissipating portions 12 is bent relative to the first heat dissipating portion 11 to form the "U-shaped" heat-dissipating portion 10 and form the first transition section 131 and the second transition section 132. It may be understood that, the first transition section 131 and the second transition section 132 each are a part of the first heat-dissipating portion 11, and are positioned at two opposite ends of the first heat-dissipating portion 11 in the length direction of the first heat-dissipating portion 11, respectively. The two transition sections 13 are respectively formed by bending the two second heat-dissipating sections 12 relative to the first heat-dissipating section 11. The first transition section 131 is positioned at a joint between one of the two second heat-dissipating portions 12 and the first heat-dissipating portion 11, and the second transition section 132 is positioned at a joint between the other one of the two second heat-dissipating portions 12 and the first heat-dissipating portion 11. One of the two second heat-dissipating portions 12 is connected to the first heat-dissipating portion 11 through the first transition section 131, and the other one of the two second heat-dissipating portions 12 is connected to the first heat-dissipating portion 11 through the second transition section 132.

The liquid inlet tube 30 is a hollow tube with openings at two ends. One end of the liquid inlet tube 30 is connected to the liquid inlet 113, and the other end of the liquid inlet tube 30 is connected to the liquid inlet through-hole 321 of the bottom case 320. The liquid outlet tube 40 is a hollow tube with openings at two ends. One end of the liquid outlet tube 40 is connected to the liquid outlet 114, and the other end of the liquid outlet tube 40 is connected to the liquid outlet through-hole 322 of the bottom case 320.

As illustrated in FIG. 5 to FIG. 9, in this embodiment, the harmonica-shaped tube 20 is of an arc-shaped structure. The harmonica-shaped tube 20 has a first wall 21, a second wall 22, a third wall 23, and a fourth wall 24. The first wall 21 and the second wall 22 are positioned facing towards each other in a width direction of the harmonica-shaped tube 20. The third wall 23 and the fourth wall 24 are positioned facing towards each other in a thickness direction of the harmonica-shaped tube 20, and are connected between the first wall 21 and the second wall 22. The first wall 21, the second wall 22, the third wall 23, and the fourth wall 24 cooperatively define a flow channel cavity 26 of the harmonica-shaped tube 20. The harmonica-shaped tube 20 further includes multiple reinforcing ribs 25. In the width direction of the harmonica-shaped tube 20, the multiple reinforcing ribs 25 are spaced apart between the first wall 21 and the second wall 22, and connect the third wall 23 to the fourth wall 24. Specifically, the number of the multiple reinforcing ribs 25 is three. The multiple reinforcing ribs 25 includes a first reinforcing rib 251, a second reinforcing rib 252, and a third reinforcing rib 253. In the width direction of the harmonica-shaped tube 20, the first reinforcing rib 251, the second reinforcing rib 252, and the third reinforcing rib 253 are spaced apart sequentially. The second reinforcing rib 252 is positioned in the middle of the harmonica-shaped tube 20. The first reinforcing rib 251 and the third reinforcing rib 253 are positioned at two opposite sides of the second reinforcing rib 252 respectively, and are each spaced apart from the second reinforcing rib 252.

Specifically, in this embodiment, a thickness of the first wall 21 of the harmonica-shaped tube 20 is II, a thickness of the second wall 22 of the harmonica-shaped tube 20 is 1) 2, a thickness of the third wall 23 of the harmonica-shaped tube 20 is D3, and a thickness of the fourth wall 24 of the harmonica-shaped tube 20 is D4. A thickness of the first reinforcing rib 251 is D5, a thickness of the second reinforcing rib 252 is D6, and a thickness of the third reinforcing rib 253 is D7. In the width direction of the harmonica-shaped tube 20, a distance between one surface of the first wall 21 and one surface of the second wall 22 positioned facing away from the one surface of the first wall 21 is L1, that is, a width of the harmonica-shaped tube 20 is L1. In the thickness direction of the harmonica-shaped tube 20, a distance between one surface of the third wall 23 and one surface of the fourth wall 24 positioned facing away from the one surface of the third wall 23 is 1.2, that is, a thickness of the harmonica-shaped tube 20 is 1.2.

In this embodiment, the harmonica-shaped tube 20 is implemented as four harmonica-shaped tubes. Two harmonica-shaped tubes 20 are disposed inside each transition section 13. The two harmonica-shaped tubes 20 are positioned in the liquid inlet channel and the liquid outlet channel inside each transition section 13, respectively. The first wall 21 and the second wall 22 of each of the two harmonica-shaped tubes 20 are positioned facing towards each other in a height direction of the heat-dissipating member 100 (Z-axis direction). The third wall 23 and the fourth wall 24 of each of the two harmonica-shaped tubes 20 are connected between the first wall 21 and the second wall 22, and are positioned facing towards each other in a thickness direction of the heat-dissipating member 100. Two of the four harmonica-shaped tubes 20 are positioned inside the first transition section 131. Specifically, one of the two harmonica-shaped tubes 20 is positioned in the liquid inlet channel inside the first transition section 131, and the flow channel cavity 26 of this harmonica-shaped tube 20 is in communication with the liquid inlet channel. The other one of the two harmonica-shaped tubes 20 is positioned in the liquid outlet channel inside the first transition section 131, and the flow channel cavity 26 of this harmonica-shaped tube 20 is in communication with the liquid outlet channel. The other two of the four harmonica-shaped tubes 20 are positioned inside the second transition section 132. Specifically, one of the other two harmonica-shaped tubes 20 is positioned in the liquid inlet channel inside the second transition section 132, and the flow channel cavity 26 of this harmonica-shaped tube 20 is in communication with the liquid inlet channel. The other one of the other two harmonica-shaped tubes 20 is positioned in the liquid outlet channel inside the second transition section 132, and the flow channel cavity 26 of this harmonica-shaped tube 20 is in communication with the liquid outlet channel.

In the disclosure, with the arrangement of the harmonica-shaped tubes 20 at the joint between the first heat-dissipating portion 12 and the second heat-dissipating portion 13, the structural strength of the heat-dissipating portion 10 at the joint between the first heat-dissipating portion 12 and the second heat-dissipating portion 13 can be strengthened. In this way, when being formed by bending, the transition section 13 between the first heat-dissipating portion 12 and the second heat-dissipating portion 13 will not be easily broken. With limitation on the dimensional relationship between the heat-dissipating portion and the harmonica-shaped tube 20, the heat-dissipating portion and the harmonica-shaped tube 20 can satisfy strength requirements. Therefore, when the heat-dissipating portion and the harmonica-shaped tube 20 are bent, the transition section 13 of the heat-dissipating portion 10 or the harmonica-shaped tube 20 can be prevented from local deformation or fracture caused by excessive stress concentration on the transition section 13 or the harmonica-shaped tube 20.

As illustrated in FIG. 3, in this embodiment, a flow path of a cooling medium in the heat-dissipating member 100 is: the liquid inlet tube 30→the liquid inlet 113→the first liquid inlet channel 111A→two harmonica-shaped tubes 20→the two second liquid inlet channels 121A→the two second liquid outlet channels 121B→the other two harmonica-shaped tubes 20→the first liquid outlet channel 111B→the liquid outlet 114→the liquid outlet tube 40.

It may be understood that, with the arrangement of the harmonica-shaped tubes 20 at the joint between the first heat-dissipating portion 11 and each of the two second heat-dissipating portions 12, the structural strength of the heat-dissipating portion 10 at the joint between the first heat-dissipating portion 11 and each of the two second heat-dissipating portions 12 can be strengthened. That is, the structural strength of the heat-dissipating portion 10 where the two transition sections 13 are positioned can be strengthened, so that the first transition section 131 or the second transition section 132 will not be easily broken when being formed by bending.

A tensile strength of the first heat-dissipating portion 11 is greater than or equal to 130 megapascal (MPa), a yield strength of the first heat-dissipating portion 11 is less than or equal to 57.6 MPa, and an elongation at break of the first heat-dissipating portion 11 is greater than or equal to 30.6%. A tensile strength of the second heat-dissipating portion 12 is greater than or equal to 130 MPa, a yield strength of the second heat-dissipating portion 12 is less than or equal to 57.6 MPa, and an elongation at break of the second heat-dissipating portion 12 is greater than or equal to 30.6%. Specifically, in this embodiment, the first heat-dissipating portion 11 has a tensile strength of 130 MPa, a yield strength of 57.6 MPa, and an elongation at break of 30.6%. The second heat-dissipating portion 12 has a tensile strength of 130 MPa, a yield strength of 57.6 MPa, and an elongation at break of 30.6%. The harmonica-shaped tube 20 has a tensile strength of 121.8 MPa, a yield strength of 61.3 MPa, and an elongation at break of 36.2%.

In this embodiment, the transition section 13 is formed by bending at the joint between the first heat-dissipating portion 11 and each of the at least one second heat-dissipating portion 12. In order to ensure that the transition section 13 and the harmonica-shaped tube 20 inside the transition section 13 are uniformly bent and do not suffer from fracture, impacts of relationships among multiple dimensions of the heat-dissipating portion 10 and the harmonica-shaped tube 20 on the mechanical performance of the heat-dissipating member 100 are simulated. The multiple dimensions include: the thickness D of each of the first heat-dissipating plate 111, the second heat-dissipating plate 112, the third heat-dissipating plate 121, and the fourth heat-dissipating plate 122, the width L1 of the harmonica-shaped tube 20, the thickness L2 of the harmonica-shaped tube 20, the thickness D1 of the first wall 21, the thickness D2 of the second wall 22, the thickness D3 of the third wall 23, the thickness D4 of the fourth wall 24, the thickness D5 of the first reinforcing rib 251, the thickness D6 of the second reinforcing rib 252, and the thickness D7 of the third reinforcing rib 253.

Simulation is made on the mechanical performance of the heat-dissipating member 100 provided in an embodiment of the disclosure. Specifically, simulation conditions are as follows. Change a value of one dimensional relationship. Control other dimensions to obtain an optimal value. Bend each of the at least one second heat-dissipating portion 12 relative to the first heat-dissipating portion 11 to define an included angle of 90 degrees (a certain process tolerance is allowed). Obtain a stress value and a plastic strain value of the transition section 13 formed by bending the heat-dissipating portion 10, and a stress value and a plastic strain value of the harmonica-shaped tube 20.

It may be noted that, before the mechanical performance of the heat-dissipating member 100 is simulated, optimal values of L1, L2, D0, D1, D2, D3, D4, D5, D6, and D7 are obtained through multiple tests. When L1, L2, D0, D1, D2, D3, D4, D5, D6, and D7 are 20 mm, 3.2 mm, 0.8 mm, 0.6 mm, 0.6 mm, 0.4 mm, 0.4 mm, 0.5 mm, 0.47 mm, and 0.5 mm respectively, the transition section 13 formed by bending the heat-dissipating portion 10 has a minimum stress value and a minimum plastic strain value, and the harmonica-shaped tube 20 has a minimum stress value and a minimum plastic strain value. Specifically, the transition section 13 of the heat-dissipating portion 10 has a stress value of 90 MPa and a plastic strain value of 10%; and the harmonica-shaped tube 20 has a stress value of 92 MPa and a plastic strain value of 15%.

TABLE 1 simulation results of the mechanical performance of the heat-dissipating member of embodiments of the disclosure

| Dimensions | Elements | Stress/MPa | Plastic strain/% | Whether to satisfy strength requirements |
|---|---|---|---|---|
| 5% < L2/L1 < 32% | Heat-dissipating portion | ≤125 | ≤29 | Yes |
| | Harmonica-shaped tube | ≤113 | ≤33 | Yes |
| 10% < D0/L2 < 40% | Heat-dissipating portion | ≤124 | ≤28 | Yes |
| | Harmonica-shaped tube | ≤114 | ≤31 | Yes |
| 40% D0 < D1 = D2 < 80% D0 | Heat-dissipating portion | ≤121 | ≤27 | Yes |
| | Harmonica-shaped tube | ≤115 | ≤31 | Yes |
| 60% D1 < D3 < D4 < 90% D1 | Heat-dissipating portion | ≤121 | ≤28 | Yes |
| | Harmonica-shaped tube | ≤117 | ≤30 | Yes |
| 80% D1 < D5 = D7 < 90% D1 | Heat-dissipating portion | ≤123 | ≤27 | Yes |
| | Harmonica-shaped tube | ≤113 | ≤31 | Yes |
| 60% D1 < D6 < 80% D1 | Heat-dissipating portion | ≤126 | ≤30 | Yes |
| | Harmonica-shaped tube | ≤114 | ≤32 | Yes |

As can be seen from the simulation results of the mechanical performance of the heat-dissipating member 100 provided in an embodiment of the disclosure, on condition that D0, D1, D2, D3, D4, D5, D6, and D7 are 0.8 mm, 0.6 mm, 0.6 mm, 0.4 mm, 0.4 mm, 0.5 mm, 0.47 mm, and 0.5 mm respectively, when 5%<L2/L1<32%, the maximum stress of the transition section 13 formed by bending the heat-dissipating portion 10 is 125 MPa, which is less than the tensile strength 130 MPa of the heat-dissipating portion 10, and therefore, the heat-dissipating portion 10 can be bent uniformly under stress without local plastic deformation caused by stress concentration. In this case, the maximum plastic strain of the transition section 13 of the heat-dissipating portion 10 is 29%, which is less than the elongation at break 30.6% of the heat-dissipating portion 10, and therefore, the transition section 13 will not be broken under stress. The maximum stress of the bent harmonica-shaped tube 20 is 113 MPa, which is less than the tensile strength 121.8 MPa of the harmonica-shaped tube 20, and therefore, the harmonica-shaped tube 20 can be bent uniformly under stress without local plastic deformation caused by stress concentration. The maximum plastic strain of the bent harmonica-shaped tube 20 is 33%, which is less than the elongation at break 36.2% of the harmonica-shaped tube 20, and therefore, the harmonica-shaped tube 20 will not be broken under stress. On condition that L1, D1, D2, D3, D4, D5, D6, and D7 are 20 mm, 0.6 mm, 0.6 mm, 0.4 mm, 0.4 mm, 0.5 mm, 0.47 mm, and 0.5 mm respectively, and 10%<D0/L2<40% is satisfied, the maximum stress of the transition section 13 formed by bending the heat-dissipating portion 10 is 124 MPa, which is less than the tensile strength 130 MPa of the heat-dissipating portion 10, and therefore, the heat-dissipating portion 10 can be bent uniformly under stress without local plastic deformation caused by stress concentration. In this case, the maximum plastic strain of the transition section 13 of the heat-dissipating portion 10 is 28%, which is less than the elongation at break 30.6% of the heat-dissipating portion 10, and therefore, the transition section 13 will not be broken under stress. The maximum stress of the bent harmonica-shaped tube 20 is 114 MPa, which is less than the tensile strength 121.8 MPa of the harmonica-shaped tube 20, and therefore, the harmonica-shaped tube 20 can be bent uniformly under stress without local plastic deformation caused by stress concentration. The maximum plastic strain of the bent harmonica-shaped tube 20 is 31%, which is less than the elongation at break 36.2% of the harmonica-shaped tube 20, and therefore, the harmonica-shaped tube 20 will not be broken under stress. Accordingly, when 1.1, 1.2, D3, D4, D5, D6, and D7 each take an optimal value, and 40% D0<D1=D2<80% D0 is satisfied, the transition section 13 of the heat-dissipating portion 10 and the harmonica-shaped tube 20 can be bent uniformly without breakage. When 1.1, 12, D0, D2, D5, D6, and D7 each take an optimal value, and 60% D1<D3<D4≤90% D1 is satisfied, the transition section 13 of the heat-dissipating portion 10 and the harmonica-shaped tube 20 can be bent uniformly without breakage. When L1, 1.2, D0, D2, D3, D4, and D6 each take an optimal value, and 80% D1<D5-D7<90% D1 is satisfied, the transition section 13 of the heat-dissipating portion 10 and the harmonica-shaped tube 20 can be bent uniformly without breakage. When 1.1, 12, D0, D2, D3, D4, D5, and D7 each take an optimal value, and 60% D1<D6<80% D1 is satisfied, the transition section 13 of the heat-dissipating portion 10 and the harmonica-shaped tube 20 can be bent uniformly without breakage. In addition, as can be seen from the simulation effect view, on condition that the above relationships are satisfied, the multiple reinforcing ribs 25 of the harmonica-shaped tube 20 can be bent without affecting the flow channel cavity 26.

It may be understood that, under bending stress, the heat-dissipating portion 10 and the harmonica-shaped tube 20 will not suffer from local plastic deformation due to stress concentration. Therefore, it can be ensured that the first liquid inlet channel 111A and the second liquid inlet channel 121A where the transition section 13 is positioned are in communication, and that the first liquid outlet channel 111B and the second liquid outlet channel 121B where the transition section 13 is positioned are in communication. In this case, flow cross-section areas of the liquid inlet channel and the liquid outlet channel can be ensured, thereby guaranteeing smooth flow of the cooling medium in the liquid inlet channel and the liquid outlet channel. In this way, the heat-dissipating portion 10 or the harmonica-shaped tube 20 can be prevented from local plastic deformation, so that the flow cross-section area of the liquid inlet channel or the flow cross-section area of the liquid outlet channel will not be reduced, thereby avoiding increasing the flow resistance of the cooling medium in the liquid inlet channel or the liquid outlet channel. In addition, both the heat-dissipating portion 10 and the harmonica-shaped tube 20 will not be broken under bending stress, thereby avoiding affecting the flow of the cooling medium in the liquid inlet channel or the liquid outlet channel.

In addition, in the harmonica-shaped tube 20, the thickness D5 of the first reinforcing rib 251 is equal to the thickness D7 of the third reinforcing rib 253, which can ensure that the strength of the first reinforcing rib 251 is equal to the strength of the third reinforcing rib 253. In this case, when the harmonica-shaped tube 20 is bent under stress, crushing towards the reinforcing rib 25 with the weaker strength due to unequal strength of the first reinforcing rib 251 or the third reinforcing rib 253 can be avoided. The thickness D6 of the second reinforcing rib 252 is less than the thickness D5 of the first reinforcing rib 251 and the thickness D7 of the third reinforcing rib 253, which can make the structural strength of the harmonica-shaped tube 20 in the middle relatively low and facilitate bending of the harmonica-shaped tube 20. Furthermore, the thickness D6 of the second reinforcing rib 252 is less than the thickness D5 of the first reinforcing rib 251 and the thickness D7 of the third reinforcing rib 253, which can also save material costs of the harmonica-shaped tube 20.

As illustrated in FIG. 2, in this embodiment, the heat-dissipating member 100 is connected to the cell module 200. Specifically, the first heat-dissipating portion 11 of the heat-dissipating member 100 is positioned at an end of the cell module 200 in the length direction of the cell module 200, and is attached to side surfaces of the four cell groups A simultaneously. Each of the two second heat-dissipating portions 12 of the heat-dissipating member 100 is positioned between one of two middle cell groups A and one of two outside cell groups A adjacent to the one of the two middle cell groups A. In addition, each of the two second heat-dissipating portions 12 is attached to surfaces of the cell groups A on two sides of the second heat-dissipating portion 12.

It may be noted that, in this embodiment, the at least one second heat-dissipating portion 12 is implemented as two second heat-dissipating portions. In other embodiments, the at least one second heat-dissipating portion 12 may also be implemented as one or more second heat-dissipating portions, as long as the second heat dissipating portion(s) 12 each is attached to surfaces of the cell group(s) A.

In this embodiment, the cell module 200 and the heat-dissipating member 100 are mounted in the box body 300. Specifically, the cell module 200 is fixed to the bottom case 320, and the heat-dissipating member 100 is fixed to the bottom case 320. The liquid inlet tube 30 of the heat-dissipating member 100 is in communication with the liquid inlet through-hole 321 of the bottom case 320, and the liquid outlet tube 40 of the heat-dissipating member 100 is in communication with the liquid outlet through-hole 322 of the bottom case 320. The cooling medium can be supplied to the heat-dissipating member 100 through the liquid inlet through-hole 321 of the bottom case 320, and the cooling medium can be discharged from the heat-dissipating member 100 through the liquid outlet through-hole 322 of the bottom case 320.

It may be noted that, the cooling medium flowing in the heat-dissipating member 100 includes, but is not limited to, cooling water, and may also be other media, which is specifically determined based on usage.

Embodiments of the disclosure are described in detail in the above. Principles and implementation manners of the disclosure are elaborated with specific embodiments herein. The illustration of embodiments above is only used to help understanding of methods and core ideas of the disclosure. Additionally, for those of ordinary skill in the art, according to ideas of the disclosure, there will be changes in the specific implementation manners and application scopes. In summary, contents of this specification may not be understood as limitation on the disclosure.

What is claimed is:

1. A heat-dissipating member, comprising a first heat-dissipating portion and at least one second heat-dissipating portion, wherein the first heat-dissipating portion is connected to the at least one second heat-dissipating portion, a transition section is formed between the first heat-dissipating portion and each of the at least one second heat-dissipating portion, the heat-dissipating member defines a liquid inlet channel and a liquid outlet channel, and the liquid inlet channel and the liquid outlet channel both are positioned inside the first heat-dissipating portion and the at least one second heat-dissipating portion and pass through the transition section;

two harmonica-shaped tubes are disposed inside the transition section, the two harmonica-shaped tubes are positioned in the liquid inlet channel and the liquid outlet channel respectively, each of the two harmonica-shaped tubes defines a flow channel cavity, the flow channel cavity of one of the two harmonica-shaped tubes positioned in the liquid inlet channel is in communication with the liquid inlet channel, and the flow channel cavity of the other one of the two harmonica-shaped tubes positioned in the liquid outlet channel is in communication with the liquid outlet channel;

the two harmonica-shaped tubes each have a first wall, a second wall, a third wall, and a fourth wall, the first wall and the second wall are positioned facing towards each other in a height direction of the heat-dissipating member, the third wall and the fourth wall are connected between the first wall and the second wall and are positioned facing towards each other in a thickness direction of the heat-dissipating member; and the first heat-dissipating portion comprises a first heat-dissipating plate and a second heat-dissipating plate, the first heat-dissipating plate and the second heat-dissipating plate are disposed facing towards each other, the at least one second heat-dissipating portion each comprises a third heat-dissipating plate and a fourth heat-dissipating plate, the third heat-dissipating plate and the fourth heat-dissipating plate are disposed facing towards each other, the first heat-dissipating plate is connected to the third heat-dissipating plate, and the second heat-dissipating plate is connected to the fourth heat-dissipating plate.

2. The heat-dissipating member of claim 1, wherein thicknesses of the first heat-dissipating plate, the second heat-dissipating plate, the third heat-dissipating plate, and the fourth heat-dissipating plate are equal and are all D0, a thickness of the first wall is D1, a thickness of the second wall is D2, and D0, D1, and D2 satisfy a relationship:

$$40\%\ D0<D1=D2<80\%\ D0.$$

3. The heat-dissipating member of claim 1, wherein a width of each of the two harmonica-shaped tubes is L1, a thickness of each of the two harmonica-shaped tubes is L2, and L1 and L2 satisfy a relationship: 5%<L2/L1<32%.

4. The heat-dissipating member of claim 1, wherein thicknesses of the first heat-dissipating plate, the second heat-dissipating plate, the third heat-dissipating plate, and the fourth heat-dissipating plate are equal and are all D0, a thickness of each of the two harmonica-shaped tubes is L2, and D0 and L2 satisfy a relationship: 10%<D0/L2<40%.

5. The heat-dissipating member of claim 1, wherein a thickness of the first wall is D1, a thickness of the third wall is D3, a thickness of the fourth wall is D4, and D1, D3, and D4 satisfy a relationship: 60% D1<D3≤D4<90% D1.

6. The heat-dissipating member of claim 1, wherein each of the two harmonica-shaped tubes further comprises a first reinforcing rib, a second reinforcing rib, and a third reinforcing rib, the first reinforcing rib, the second reinforcing rib, and the third reinforcing rib are positioned between the third wall and the fourth wall, and in a width direction of each of the two harmonica-shaped tubes, the first reinforcing rib, the second reinforcing rib, and the third reinforcing rib are spaced apart sequentially; and a thickness of the first reinforcing rib is D5, a thickness of the second reinforcing rib is D6, a thickness of the third reinforcing rib is D7, and D5, D6, and D7 satisfy a relationship:

$$D6<D5=D7.$$

7. The heat-dissipating member of claim 6, wherein a thickness of the first wall is D1, and the thickness D5 of the first reinforcing rib, the thickness D7 of the third reinforcing rib, and the thickness D1 of the first wall satisfy a relationship: 80% D1<D5=D7<90% D1.

8. The heat-dissipating member of claim 6, wherein a thickness of the first wall is D1, and the thickness D6 of the second reinforcing rib and the thickness D1 of the first wall satisfy a relationship: 60% D1<D6<80% D1.

9. The heat-dissipating member of claim 6, wherein the at least one second heat-dissipating portion is implemented as two second heat-dissipating portions, the two second heat-dissipating portions are disposed facing towards each other in a width direction of the heat-dissipating member, and the first heat-dissipating portion is connected between the two second heat-dissipating portions.

10. An energy-storage apparatus, comprising a box body, a cell module, and a heat-dissipating member, wherein the box body defines a liquid inlet through-hole and a liquid outlet through-hole, the heat-dissipating member and the cell module are accommodated in the box body, and the heat-dissipating member is attached to a surface of the cell module;

wherein the heat-dissipating member comprises a first heat-dissipating portion and at least one second heat-dissipating portion, wherein the first heat-dissipating portion is connected to the at least one second heat-dissipating portion, a transition section is formed between the first heat-dissipating portion and each of the at least one second heat-dissipating portion, the heat-dissipating member defines a liquid inlet channel and a liquid outlet channel, and the liquid inlet channel and the liquid outlet channel both are positioned inside the first heat-dissipating portion and the at least one second heat-dissipating portion and pass through the transition section;

the liquid inlet channel is in communication with the liquid inlet through-hole, and the liquid outlet channel is in communication with the liquid outlet through-hole;

two harmonica-shaped tubes are disposed inside the transition section, the two harmonica-shaped tubes are positioned in the liquid inlet channel and the liquid outlet channel respectively, each of the two harmonica-shaped tubes defines a flow channel cavity, the flow channel cavity of one of the two harmonica-shaped tubes positioned in the liquid inlet channel is in communication with the liquid inlet channel, and the flow channel cavity of the other one of the two harmonica-shaped tubes positioned in the liquid outlet channel is in communication with the liquid outlet channel;

the two harmonica-shaped tubes each have a first wall, a second wall, a third wall, and a fourth wall, the first wall and the second wall are positioned facing towards each other in a height direction of the heat-dissipating member, the third wall and the fourth wall are connected between the first wall and the second wall and are positioned facing towards each other in a thickness direction of the heat-dissipating member; and the first heat-dissipating portion comprises a first heat-dissipating plate and a second heat-dissipating plate, the first heat-dissipating plate and the second heat-dissipating plate are disposed facing towards each other, the at least one second heat-dissipating portion each comprises a third heat-dissipating plate and a fourth heat-dissipating plate, the third heat-dissipating plate and the fourth heat-dissipating plate are disposed facing towards each other, the first heat-dissipating plate is connected to the third heat-dissipating plate, and the second heat-dissipating plate is connected to the fourth heat-dissipating plate.

11. The energy-storage apparatus of claim 10, wherein thicknesses of the first heat-dissipating plate, the second heat-dissipating plate, the third heat-dissipating plate, and the fourth heat-dissipating plate are equal and are all D0, a thickness of the first wall is D1, a thickness of the second wall is D2, and D0, D1, and D2 satisfy a relationship:

$$40\%\ D0<D1=D2<80\%\ D0.$$

12. The energy-storage apparatus of claim 10, wherein a width of each of the two harmonica-shaped tubes is L1, a thickness of each of the two harmonica-shaped tubes is L2, and L1 and L2 satisfy a relationship: 5%<L2/L1<32%.

13. The energy-storage apparatus of claim 10, wherein thicknesses of the first heat-dissipating plate, the second heat-dissipating plate, the third heat-dissipating plate, and the fourth heat-dissipating plate are equal and are all D0, a thickness of each of the two harmonica-shaped tubes is L2, and D0 and L2 satisfy a relationship: 10%<D0/L2<40%.

14. The energy-storage apparatus of claim 10, wherein a thickness of the first wall is D1, a thickness of the third wall is D3, a thickness of the fourth wall is D4, and D1, D3, and D4 satisfy a relationship: 60% D1<D3≤D4<90% D1.

15. The energy-storage apparatus of claim 10, wherein each of the two harmonica-shaped tubes further comprises a first reinforcing rib, a second reinforcing rib, and a third reinforcing rib, the first reinforcing rib, the second reinforcing rib, and the third reinforcing rib are positioned between the third wall and the fourth wall, and in a width direction of each of the two harmonica-shaped tubes, the first reinforcing rib, the second reinforcing rib, and the third reinforcing rib are spaced apart sequentially; and a thickness of the first reinforcing rib is D5, a thickness of the second reinforcing rib is D6, a thickness of the third reinforcing rib is D7, and D5, D6, and D7 satisfy a relationship:

$$D6<D5=D7.$$

16. The energy-storage apparatus of claim 15, wherein a thickness of the first wall is D1, and the thickness D5 of the first reinforcing rib, the thickness D7 of the third reinforcing rib, and the thickness D1 of the first wall satisfy a relationship: 80% D1<D5=D7<90% D1.

17. The energy-storage apparatus of claim 15, wherein a thickness of the first wall is D1, and the thickness D6 of the second reinforcing rib and the thickness D1 of the first wall satisfy a relationship: 60% D1<D6<80% D1.

18. The energy-storage apparatus of claim 15, wherein the at least one second heat-dissipating portion is implemented as two second heat-dissipating portions, the two second heat-dissipating portions are disposed facing towards each other in a width direction of the heat-dissipating member, and the first heat-dissipating portion is connected between the two second heat-dissipating portions.

19. An electricity-consumption device, comprising an energy-storage apparatus, the energy-storage apparatus comprising a box body, a cell module, and a heat-dissipating member, wherein the box body defines a liquid inlet through-hole and a liquid outlet through-hole, the heat-dissipating member and the cell module are accommodated in the box body, and the heat-dissipating member is attached to a surface of the cell module;

wherein the heat-dissipating member comprises a first heat-dissipating portion and at least one second heat-dissipating portion, wherein the first heat-dissipating portion is connected to the at least one second heat-dissipating portion, a transition section is formed between the first heat-dissipating portion and each of the at least one second heat-dissipating portion, the heat-dissipating member defines a liquid inlet channel and a liquid outlet channel, and the liquid inlet channel and the liquid outlet channel both are positioned inside the first heat-dissipating portion and the at least one second heat-dissipating portion and pass through the transition section;

the liquid inlet channel is in communication with the liquid inlet through-hole, and the liquid outlet channel is in communication with the liquid outlet through-hole;

two harmonica-shaped tubes are disposed inside the transition section, the two harmonica-shaped tubes are positioned in the liquid inlet channel and the liquid outlet channel respectively, each of the two harmonica-shaped tubes defines a flow channel cavity, the flow channel cavity of one of the two harmonica-shaped tubes positioned in the liquid inlet channel is in communication with the liquid inlet channel, and the flow channel cavity of the other one of the two harmonica-shaped tubes positioned in the liquid outlet channel is in communication with the liquid outlet channel;

the two harmonica-shaped tubes each have a first wall, a second wall, a third wall, and a fourth wall, the first wall and the second wall are positioned facing towards each other in a height direction of the heat-dissipating member, the third wall and the fourth wall are connected between the first wall and the second wall and are positioned facing towards each other in a thickness direction of the heat-dissipating member; and the first heat-dissipating portion comprises a first heat-dissipating plate and a second heat-dissipating plate, the first heat-dissipating plate and the second heat-dissipating plate are disposed facing towards each other, the at least one second heat-dissipating portion each comprises a third heat-dissipating plate and a fourth heat-dissipating plate, the third heat-dissipating plate and the fourth heat-dissipating plate are disposed facing towards each other, the first heat-dissipating plate is connected to the third heat-dissipating plate, and the second heat-dissipating plate is connected to the fourth heat-dissipating plate.

20. The electricity-consumption device of claim 19, wherein thicknesses of the first heat-dissipating plate, the second heat-dissipating plate, the third heat-dissipating plate, and the fourth heat-dissipating plate are equal and are all D0, a thickness of the first wall is D1, a thickness of the second wall is D2, and D0, D1, and D2 satisfy a relationship:

$$40\%\ D0 < D1 = D2 < 80\%\ D0.$$

* * * * *